United States Patent [19]

Shonnard et al.

[11] 4,102,317
[45] Jul. 25, 1978

[54] APPARATUS FOR IGNITING CHARCOAL BRIQUETTES

[76] Inventors: John R. Shonnard, 5 Wells La., East Setauket, N.Y. 11733; Rocco J. Natale, 57 Glenwood Dr., Hauppauge, N.Y. 11787

[21] Appl. No.: 769,407

[22] Filed: Feb. 16, 1977

[51] Int. Cl.² .............................................. F24B 3/00
[52] U.S. Cl. ...................................... 126/25 B; 44/41; D23/90.1
[58] Field of Search ................ 126/25 B, 59.5, 152 R; 110/1 F, 18 R; 44/38, 40, 41; D23/90.1

[56] References Cited

U.S. PATENT DOCUMENTS

| | | | |
|---|---|---|---|
| 1,113,478 | 10/1914 | Phillips | 44/40 |
| 2,834,661 | 5/1958 | Chaplin | 126/25 B |
| 3,062,200 | 11/1962 | Miller | 126/25 B |
| 3,073,263 | 1/1963 | Wynkoop | 110/1 F |
| 3,177,826 | 4/1965 | Cohen | 110/1 F |
| 3,297,420 | 1/1967 | Klink et al. | 44/38 X |
| 3,374,071 | 3/1968 | Corriher, Jr. et al. | 110/1 F X |
| 3,628,474 | 12/1971 | Rehwaldt | 126/25 B X |

FOREIGN PATENT DOCUMENTS

| | | | |
|---|---|---|---|
| 37,397 | 5/1909 | Austria | 126/59.5 |
| 880,239 | 9/1971 | Canada | 44/41 |

*Primary Examiner*—Kenneth W. Sprague
*Assistant Examiner*—Harold Joyce
*Attorney, Agent, or Firm*—Arthur L. Plevy

[57] ABSTRACT

There is disclosed a structure for rapidly and efficiently igniting charcoal briquettes of the type employed with home barbeque grills.

A housing generally comprises a longitudinal cylindrical form fabricated from a plurality of non-combustible rings which are secured to a frame to form an enclosure for accomodating a desired amount of fuel. The frame includes a central support ring located near the top end of the housing and a bar located a given distance from the bottom of the housing. The bar has a projecting central portion.

A sheet of combustible material is rolled to form a tubular member and is inserted in and encircled by the top support ring of the frame with the projection on the bottom bar surrounded by the tube at the other end. The combustible tube forms a flue and is surrounded by charcoal which is emplaced within the housing. The tubular flue is then lit.

The housing in combination with the flue causes a rapid circulation of heated air. The process is regenerative and the charcoal briquettes which surround the flue are rapidly and efficiently ignited.

9 Claims, 6 Drawing Figures

APPARATUS FOR IGNITING CHARCOAL BRIQUETTES

BACKGROUND OF INVENTION

The present invention relates to apparatus for kindling fuel and more particularly to a housing and flue assembly for use in rapidly igniting charcoal briquettes.

Needless to say, man has been burning fuel and starting fires since the beginning of time. The patent art is indicative of this, there are a multitude of structures and apparatus to accomplish efficient kindling and rapid burning of all sorts and types of materials.

Presently modern man engages in a ritual generally referred to as the home barbeque and this practice has resulted in a huge industry involving the supply of grills and charcoal briquettes.

The outdoor preparation of food with charcoal is an experience which is widely shared and enjoyed in the United States and elsewhere. The prior art cognizant of the problems inherent in starting and maintaining an efficient charcoal fire includes many patents which attempt to expedite the task. It would be correct to state that a great majority of such fires are started by the use of a liquid igniting material. The user would form a pyramid like pile of charcoal briquettes, saturate the same with the liquid and light the saturated pile with a match or otherwise. This approach besides being dangerous, was and is inefficient while further causing unpleasant fumes and odors due to the characteristics of the liquid starters. Furthermore such liquid starters are made from petroleum by-products and are becoming increasingly more expensive.

Other approaches in the patent art involved the use of pre-packaged containers including charcoal and an igniting scheme. The theory behind such structures were that a consumer could purchase a single package, place the same on his grill and ignite the package to thereby, hopefully, ignite the charcoal contents. Such packages were and are commercially unsuccessful due to many reasons as they did not operate properly, would fail to ignite, did not contain enough charcoal, required a consumer to engage in complicated assembly procedures and so on. While such prepackaged products attempted to eliminate the use of a starter fluid, they had disadvantages and hence were not accepted by the public.

There are, of course, electric starters and other electrical devices which do not provide reliable and uniform ignition of charcoal fuel.

The problem of efficiently and reliably starting a charcoal fire without a fluid still exists.

It is, therefore, an object of the present invention to provide an improved apparatus for starting a charcoal fire without employing a starting fluid, while further providing to the consumer the capability of using as much or as little charcoal as desired, while further assuring a rapid and complete ignition of the charcoal briquettes.

DESCRIPTION OF PREFERRED EMBODIMENT

Apparatus for igniting charcoal briquettes or similar fuel comprises a plurality of spaced rings secured relatively coaxially to one another to form a longitudinal tubular housing symmetrically disposed about an axis, a smaller ring coupled to said housing is coaxially positioned at a top end and a combustible flue comprising a tubular member of a combustible material is positioned within, and encircled by said smaller ring and extends vertically toward the bottom end of said housing, said housing is adapted to accomodate a plurality of charcoal briquettes positioned within the space between said rings and said flue to cause said briquettes to ignite when said flue is burned mainly due to regenerative hot air currents circulating through said flue.

DETAILED DESCRIPTION OF THE FIGURES

Figure 1:
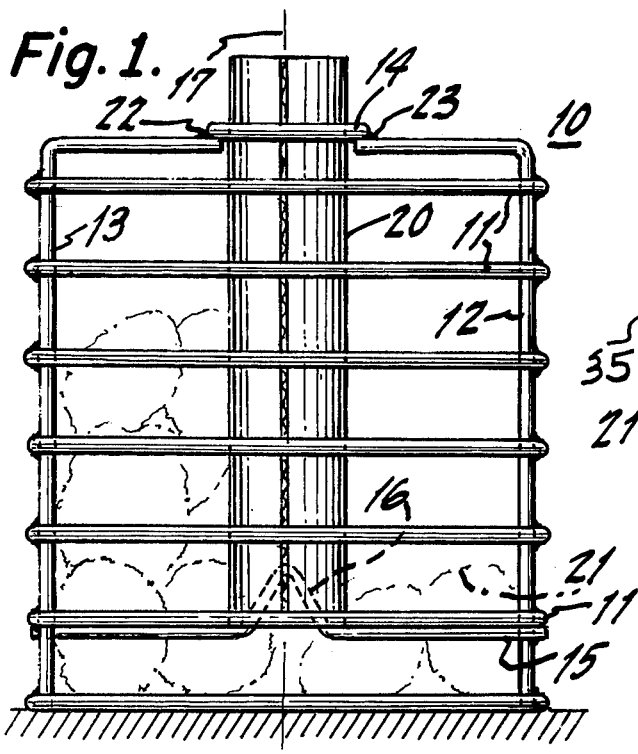
FIG. 1 is a side elevational view of a briquette igniting apparatus according to this invention.

Referring to FIG. 1, there is shown a housing 10 for accomodating a plurality of charcoal briquettes, 21 to be ignited. The housing 10 is generally a longitudinal cylindrical member symmetrically disposed about axis 17.

The housing 10 includes a right and a left vertically extending frame members 12 and 13. The vertical members 12 and 13 are of an inverted "L" configuration with the ends of the "L" facing each other. Disposed about the frame members 12 and 13 are a series of ring members 11, relatively equally spaced and coaxially retained about axis 17, by a weld to secure each ring 11 to the vertical frame members 12 and 13. Each ring as 11 is formed from a steel wire stock and is formed into a circular or other pattern and welded at opposing ends 35 to form a ring. Secured to the top end of the "L" members 12 and 13 is a central ring member 14. The ring member 14 is also relatively coaxial with the members 11 and has its center about axis 17. The ring member 14 is secured to the brackets 12 and 13 by suitable welds as 22 and 23. Positioned above the bottom end of the housing 10 and relatively along a diameter of a ring member 11 is a horizontal bar 15 having a centrally depending "V" shape projection 16. The projection 16 faces the ring 14 and has two sloping sides depending from the main axis 17. The entire housing thus depicted consists of two vertical "L" shaped frame members 12 and 13 having welded thereto a series of horizontal, coaxial ring members 11. A smaller but coaxial ring member 14 is secured to the facing ends of the "L" brackets. The ring is located above a horizontal bar 15 with a projecting center region 16. The entire housing 10 is fabricated from a suitable metal such as steel and so on, and each of the components depicted are welded one to the other to form a rigid and strong structural assembly capable of being used many times over for the ignition of charcoal or similar fuels.

Figure 4B:
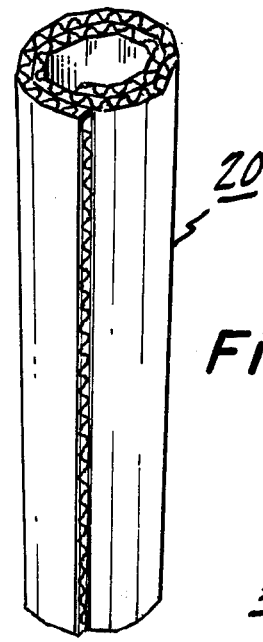
FIGS. 4A and 4B are perspective views showing the formation of a tubular flue according to this invention.
Figure 4A:
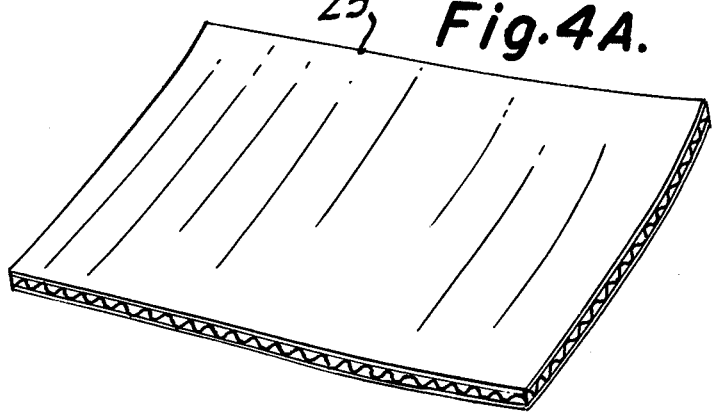

Shown encircled by the top ring 14 and surrounding the projection 16 of bar 15 is a combustible flue member 20. The flue member 20 is a tubular member of a combustible material such as cardboard, paper and so on. Particularly member 20 is formed from a sheet of suitable material such as a corrugated cardboard which may be impregnated or coated with a wax or other substance to facilitate burning. In any event ordinary untreated cardboard will suffice. The sheet 25 as in FIG. 4A is rolled upon itself to form member 20. It is noted that the sheet 25 is of a sufficient length to allow one to provide a layered wrap having more than one turn. The multiple turns permit the "V" shaped projection 16 associated with bar 15 to assure that the flue 20 will not unravel or uncoil during burning of the flue.

Figure 2:
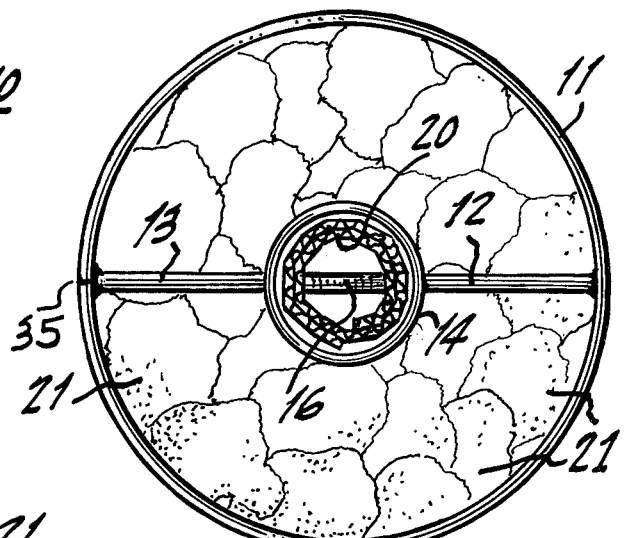
FIG. 2 is a top plan view of the apparatus of FIG. 1.
Figure 3:
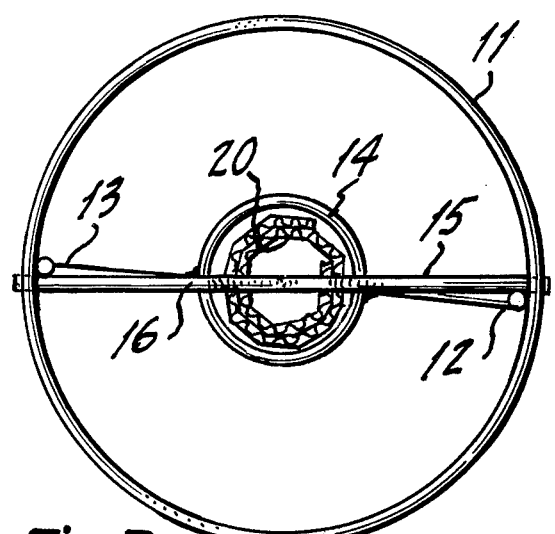
FIG. 3 is a bottom plan view of the apparatus of FIG. 1.

FIG. 2 depicts a top view of the apparatus of FIG. 1 with the same reference numerals depicting similar parts. The spacing between the rings 11 is such that a plurality of charcoal briquettes 21 can be retained within the bottom of housing 10 or between the central flue 20 and the outer rings 11. The user, of course, can emplace as many charcoal or fuel elements as desired in order to accomodate a particular grill or location. Essentially as seen from the above figures, one has an enclosure for containing fuel briquettes 21 with a combustible, vertically extending central flue 20. The ring 11 and frame arrangement allow for efficient air circulation for the contained briquettes and permit efficient operation as will be explained.

Figure 5:
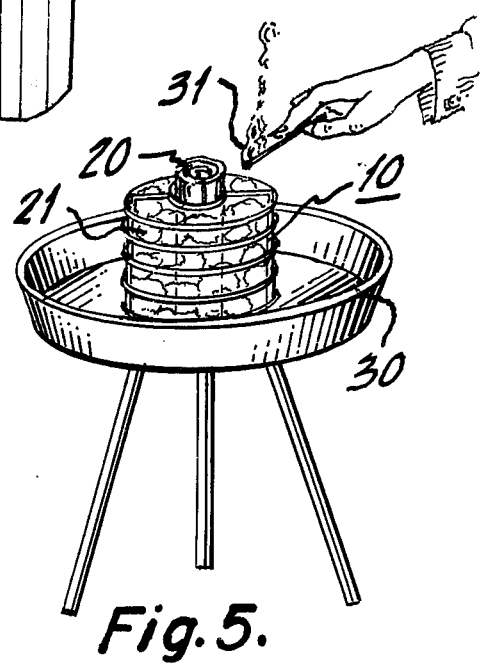
FIG. 5 is a plan view useful in explaining the use and operation of the invention.

Shown in FIG. 5 is a preferred use of the apparatus depicted. A user would place the housing 10 on the surface of a grill 30 or elsewhere and then by means of a match 31 or other flame light the cardboard flue 20. The flue 20, which as indicated, is combustible and proceeds to burn. As soon as burning of the flue commences a strong draft of heated air is induced by the combustion. As noted, the bar 15 is supported above the bottom of housing 10 and hence an air space is present beneath projection 16. The heated air is rapidly conducted upwards through the central passageway of the flue 20. Once the process commences it is regenerative and the air forced through the flue is heated to higher and higher temperatures. The charcoal briquettes, which have their edges about the central flue 20 rapidly ignite. As the flue continues burning the ignition of the fuel spreads outwardly toward the rings 11.

It is noted that as the flue burns or decomposes the central area occupied by the flue is still present due to the tendency of the briquettes 21 to key or melt together based on the intense heat.

When the flue is sufficiently burned one can then lift the housing 10 with a suitable tool and spread the briquettes over the surface of the grill or over a suitable surface desired.

It is noted that the housing 10 can be used over and over with additional flue members rolled as desired. The housing 10 permits one to select a desired amount of charcoal only limited by the volume of the housing 10. It is understood that other embodiments as well as different forms can be achieved without departing from the scope of the invention. It is understood that different configuration rings could be employed in lieu of the circular ones depicted as well as different techniques for supporting the same about the vertical frame members. The advantages of the structure enable one to ignite fuel such as briquettes rapidly and reliably without a liquid ignition and to reuse the housing as often as desired solely by replacing the corrugated cardboard flue, which is simple and rapid to construct and inexpensive in cost.

We claim:

1. Apparatus for igniting charcoal briquettes or similar fuels, comprising:

a frame member comprising a right and a left vertical bracket each of an "L" shaped configuration with the inverted top ends of said "L"s facing each other; a plurality of spaced rings, each of said spaced rings secured to said brackets and transverse to said brackets to form a longitudinal tubular housing member, a smaller ring positioned at said top end of said housing, said smaller ring secured to said top ends of said right and left brackets and positioned relatively coaxially to said rings; a horizontal bar located near said bottom end of said housing and positioned relatively on a diameter of one of said spaced rings and including a central projection on said bar, a combustible tubular flue member, said tubular flue member positioned within and encircled by said smaller ring at one end and surrounding said projection of said horizontal bar at said other end, said housing adapted to accommodate a plurality of charcoal briquettes positioned within the space between said rings and said flue, to cause said briquettes to ignite when said flue is burned.

2. The apparatus according to claim 1 wherein said combustible tubular member is formed from a sheet of combustible material which is rolled into a tubular member having more than one turn and of a diameter relatively equal to the diameter of said smaller ring.

3. The apparatus according to claim 2, wherein said combustible material is corrugated cardboard.

4. The apparatus according to claim 1, wherein said spaced rings, said smaller ring, said frame members and said bar are fabricated from steel.

5. Apparatus for igniting a briquette type fuel, comprising:

a. A frame having a right and a left vertically extending member, a plurality of horizontal rings located about said members and spaced at a predetermined interval one from the other, each of said rings secured at one end to said left and right extending members, to form a longitudinal housing having said rings about said vertical members arranged coaxially from a top to a bottom end;

b. A smaller ring coupled to said right and left vertical members at said top end and positioned relatively coaxial with said horizontal rings;

c. A bar having a central "V" shaped projection positioned near said bottom end and along a diameter of one of said horizontal rings with said "V" projection extending upwards towards the center of said smaller ring;

d. A tubular flue comprising at least one turn of a conbustible material extending vertically through said housing with a top portion of said tubular member encircled by said smaller ring and with said projection surrounded by said bottom end of said tubular member to retain the shape of said tubular member upon burning of said flue, whereby when said fuel is emplaced between said horizontal rings and said flue said fuel ignites upon burning of said flue due mainly to regenerative hot air currents circulating through said flue.

6. The apparatus according to claim 5, wherein said vertically extending members and said rings are fabricated from steel with said rings being welded to said members.

7. The apparatus according to claim 5, wherein said tubular flue comprises at least one turn of a corrugated cardboard sheet.

8. The apparatus according to claim 7, wherein said sheet of cardboard is coated with a combustible wax.

9. The apparatus according to claim 5, wherein said fuel is charcoal briquettes of a diameter larger than said predetermined interval spacing of said horizontal rings to prevent said fuel from passing through said space between said rings when accomodated by said housing.

* * * * *